United States Patent [19]

Tanaka et al.

[11] Patent Number: 4,823,273

[45] Date of Patent: Apr. 18, 1989

[54] AREA CUTTING METHOD

[75] Inventors: Kunio Tanaka; Yasushi Onishi, both of Tokyo, Japan

[73] Assignee: Fanuc Ltd., Minamitsuru, Japan

[21] Appl. No.: 36,678

[22] PCT Filed: Jul. 17, 1986

[86] PCT No.: PCT/JP86/00367

§ 371 Date: Mar. 16, 1987

§ 102(e) Date: Mar. 16, 1987

[87] PCT Pub. No.: WO87/00648

PCT Pub. Date: Jan. 29, 1987

[30] Foreign Application Priority Data

Jul. 17, 1985 [JP] Japan .................. 60-157926

[51] Int. Cl.⁴ .......................... G05B 19/403
[52] U.S. Cl. ................................. 364/474.29
[58] Field of Search ............ 364/474, 475, 167, 168, 364/169, 170; 409/80

[56] References Cited

U.S. PATENT DOCUMENTS

| | | | |
|---|---|---|---|
| 4,503,493 | 3/1985 | Burkhardt et al. | 364/170 |
| 4,543,625 | 9/1985 | Nozawa et al. | 364/474 X |
| 4,589,062 | 5/1986 | Kishi et al. | 364/474 X |
| 4,621,959 | 11/1986 | Kishi et al. | 364/475 X |
| 4,689,750 | 8/1987 | Kishi et al. | 364/474 |

Primary Examiner—John R. Lastova
Attorney, Agent, or Firm—Staas & Halsey

[57] ABSTRACT

The invention relates to an area cutting method in which a tool is moved along a plurality of paths (CP3–CPo, LP5–LP1) successively offset in an inward direction from a closed curve (OFC) specifying an area (AR), or in other words, in which the tool is moved in a spider web-like pattern, to cut the interior of the area. More particularly, the invention relates to an area cutting method in which, when an area is divided into a plurality of convex polygons, the number of cutting paths in each convex polygonal portion is decided in dependence upon the size of the convex polygon and the cut-in pitch (path interval) of each convex polygonal portion is made substantially the allowable cut-in pitch.

9 Claims, 10 Drawing Sheets

AREA CUTTING METHOD

CROSS-REFERENCE TO RELATED APPLICATION

This application is related to U.S. patent application Ser. No. 36,679, filed concurrently with this application on Mar. 16, 1987.

BACKGROUND OF THE INVENTION

1. Technical Field

This invention relates to an area cutting method and, more particularly, to an area cutting method through which the interior of an area bounded by a closed curve can be cut efficiently.

2. Description of the Related Art

Forms of numerically controlled machining include cutting in which the interior of an area bounded by a closed curve is hollowed out down to a predetermined depth, and die milling in which the interior of an area is die milled. In such machining, as shown in FIG. 8(A), an area cutting method is conventionally carried out by performing cutting along an (i−1)th cutting path PTi=1 in one direction (the direction of the solid line arrow), raising the tool a predetermined amount at the completion of cutting, then positioning the tool directly above a cutting starting point Ps on the next, or i-th, cutting path PTi, thereafter lowering the tool to the cutting starting point Ps, moving the tool along the i-th cutting path PTi in the direction of the solid line arrow, and subsequently repeating the above unidirectional cutting.

Figure 8:
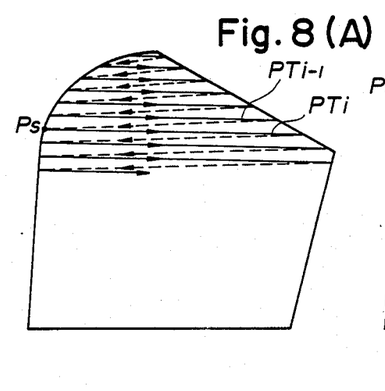
FIGS. 8(A)-8(D) are side and top views of a conventional area cutting method.

Another area cutting method shown in FIG. 8(B) includes, following completion of cutting along the cutting path PTi−1 of the (i−1)th cutting path, moving the tool from a cutting end point Pe to the cutting starting point Ps on the next, or i-th, cutting path, and thereafter performing cutting along the i-th cutting path PTi. Thus, cutting is performed back and forth in the direction of the arrows.

Still another area cutting method shown in FIG. 8(C) includes obtaining offset paths OFC1, OFC2, . . . OFCn offset by predetermined amounts with respect to a curve OLC of an external shape, and moving the tool successively along the offset paths.

However, with the first area cutting method based on unidirectional cutting, the tool must be positioned at the cutting starting point Ps on the i-th cutting path PTi after the completion of cutting along the (i−1)th cutting path PTi−1. This method is disadvantageous in that it results in a long tool traveling distance.

Figure 9:
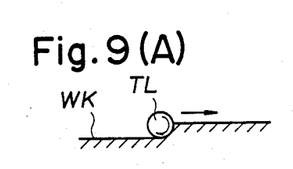
FIGS. 9(A)-9(D) are views for describing up cutting and down cutting processes.

With the second cutting method based on reciprocative cutting, portions are left uncut. In order to cut the uncut portions, the tool must be moved along the external shape curve OLC at completion of the back-and-forth cutting, thereby necessitating both back-and-forth cutting control and cutting control along the shape of the external curve. Accordingly, this method is disadvantageous in that control is complicated. Further, if an area AR has concavities and convexities, as shown in FIG. 8(D), the second method requires movement for achieving positioning indicated by the dashed lines. This is disadvantageous in that tool travelling distance and cutting time are prolonged. In addition, since the cutting process for the outward trip is different from the cutting process for the return trip, cutting cannot be performed efficiently overall. It should be noted that the cutting processes referred to here indicate up cutting and down cutting processes. FIGS. 9(A) and 9(B) show examples of the down cutting process, and FIGS. 9(C)/(D) depict examples of the up cutting process. If the workpiece material has been decided, then a cutting method capable of cutting the workpiece efficiently is selected from the up cutting and down cutting processes. However, with the second method, the up cutting process [e.g. FIG. 9(A)] and the down cutting process [e.g. FIG. 9(C)] are always mixed, so that cutting cannot be performed efficiently.

With the third method of cutting along the offset paths, portions are left uncut at, e.g., the central portion of the area, depending upon the contour of the external shape curve. This method is disadvantageous in that dealing with these uncut portions is a complicated task.

Figure 10A:
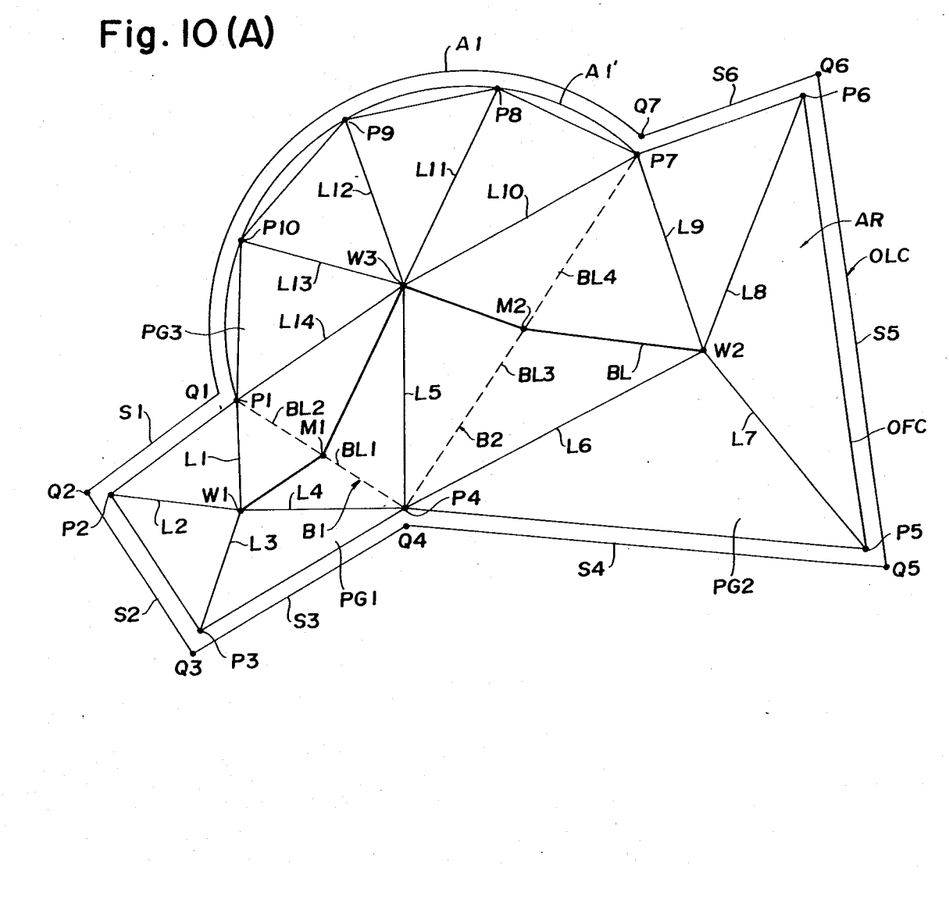
FIGS. 10(A)-10(B) are views for describing a proposed spider web pattern area cutting method.
Figure 10B:
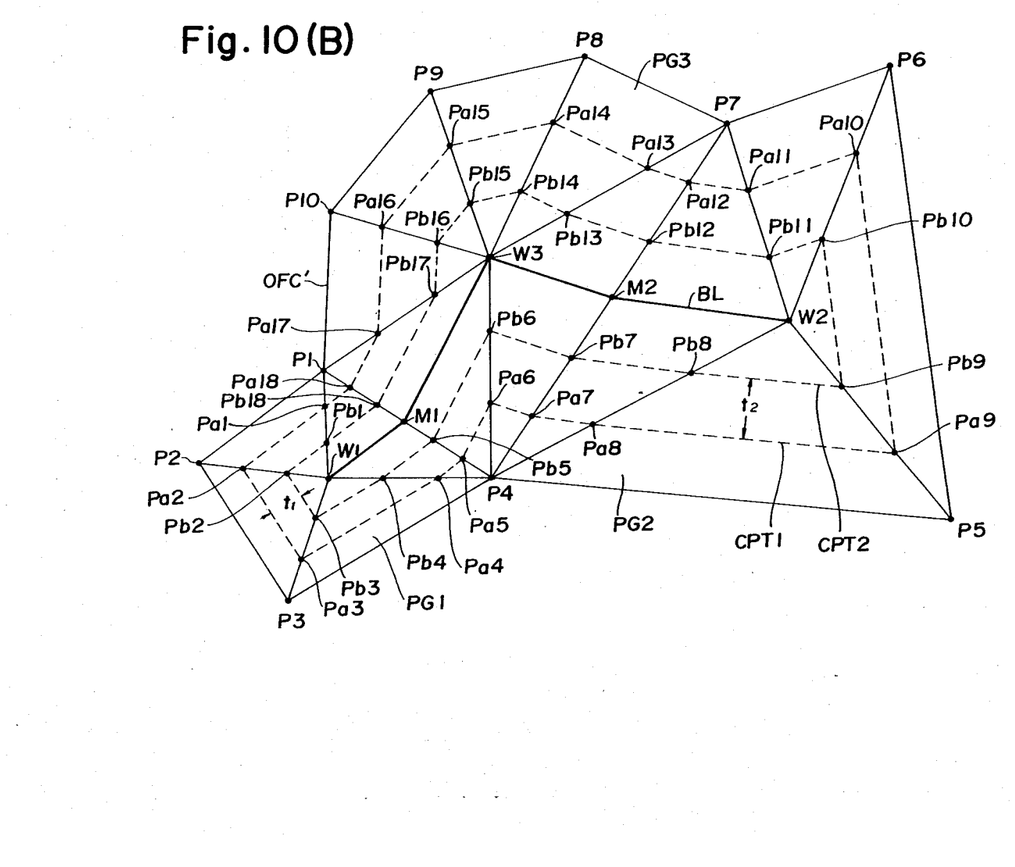

Accordingly, in order to eliminate the aforementioned drawbacks of the conventional method, the applicant has proposed a method in which a tool path in the form of a spider web pattern is decided within the area and a tool is moved along the tool path to machine the area. (For example, refer to the specification of U.S. Ser. No. 744,746.) FIGS. 10(A) and 10(B) are views for describing this area cutting method. The area cutting method is composed of the following steps:

(1) For cutting the interior of an area AR bounded by an external shape curve OLC comprising a number of straight lines S1, S2, . . . S6 and a circular arc A1, linearly approximating a circular arc portion A1' of an offset curve OFC offset a predetermined amount from the external shape curve;

(2) dividing an area bounded by the linearly approximated offset curve into a plurality of convex polygons PG1–PG3;

(3) calculating the centroid Wi of each convex polygon and the mid-points M1, M2 of boundary lines B1, B2 of two mutually adjacent convex polygons and generating a base line BL obtained by successively connecting each centroid and each mid-point;

(4) partitioning, into a predetermined number of partitions, straight lines L1–L14 connecting the centroids Wi of the convex polygons and the apices P1–P10 of the convex polygons, and straight lines BL1–BL4 connecting the mid-points M1, M2 and the two ends P1, P4; P4, P7 of the boundary lines bisected by the mid-points;

(5) moving a tool along plural closed paths CPT1, CPT2, . . . obtained by connecting partitioning points Pa1, Pa2, . . . Pa18; Pb1, Pb2, . . . Pb18, which correspond to the straight lines L1–L14, BL1–BL4, in such a manner that the base line BL is enclosed, and moving the tool along the base line BL, and (6) moving the tool along the offset curve OFC.

According to this method, area cutting can be carried out while moving the tool continuously. This is advantageous in that it eliminates wasted tool movement and shortens cutting time in comparison with the prior-art method. It also does not leave any uncut portions at, e.g., the central part of the area.

However, if the sizes of the convex polygons differ greatly from one another in the proposed area cutting method, the cut-in pitch of a smaller convex polygon is considerably shorter than that of a larger convex polygon [(see the cut-in pitches $t_1$, $t_2$ of convex polygons PG1, PG2 in FIG. 10(B)].

It should be possible to cut the small convex polygonal portion at the cut-in pitch $t_2$ of the large convex polygonal portion. If the small convex polygonal portion is cut at the larger cut-in pitch, cutting efficiency can improved.

With the conventional proposed method, however, the cut-in pitch of each convex polygonal portion is decided depending upon the size of the convex polygon. Consequently, the small convex polygonal portion is cut in at the small cut-in pitch, as a result of which cutting efficiency declines.

SUMMARY OF THE INVENTION

Accordingly, an object of the present invention is to provide an area cutting method in which the number of cutting paths of each convex polygonal portion is varied in dependence upon the size of the convex polgyon so that any convex polygonal portion can be cut at a cut-in pitch close to that of an allowable cut-in pitch.

Another object of the present invention is to provide an area cutting method in which a small convex polygonal portion can be cut efficiently with a small amount of tool movement.

The present invention relates to an area cutting method in which a tool is moved along a plurality of paths successively offset in an inward direction from a closed curve specifying an area, or in other words, in which the tool is moved in a spiderweb-like pattern, to cut the interior of the area. More particularly, the invention relates to an area cutting method in which, when an area is partitioned into a plurality of convex polygons, the number of cutting paths in each convex polygonal portion is decided in dependence upon the size of the convex polygon and the cut-in pitch (path interval) of each convex polygonal portion is made substantially the allowable cut-in pitch.

More specifically, by reducing the number of cutting paths for a small convex polygon and increasing the number of cutting paths for a large convex polygon, the cut-in pitch of each convex polygonal portion is made substantially the allowable cut-in pitch, thereby improving cutting efficiency.

DESCRIPTION OF THE PREFERRED EMBODIMENTS

Figure 1A:
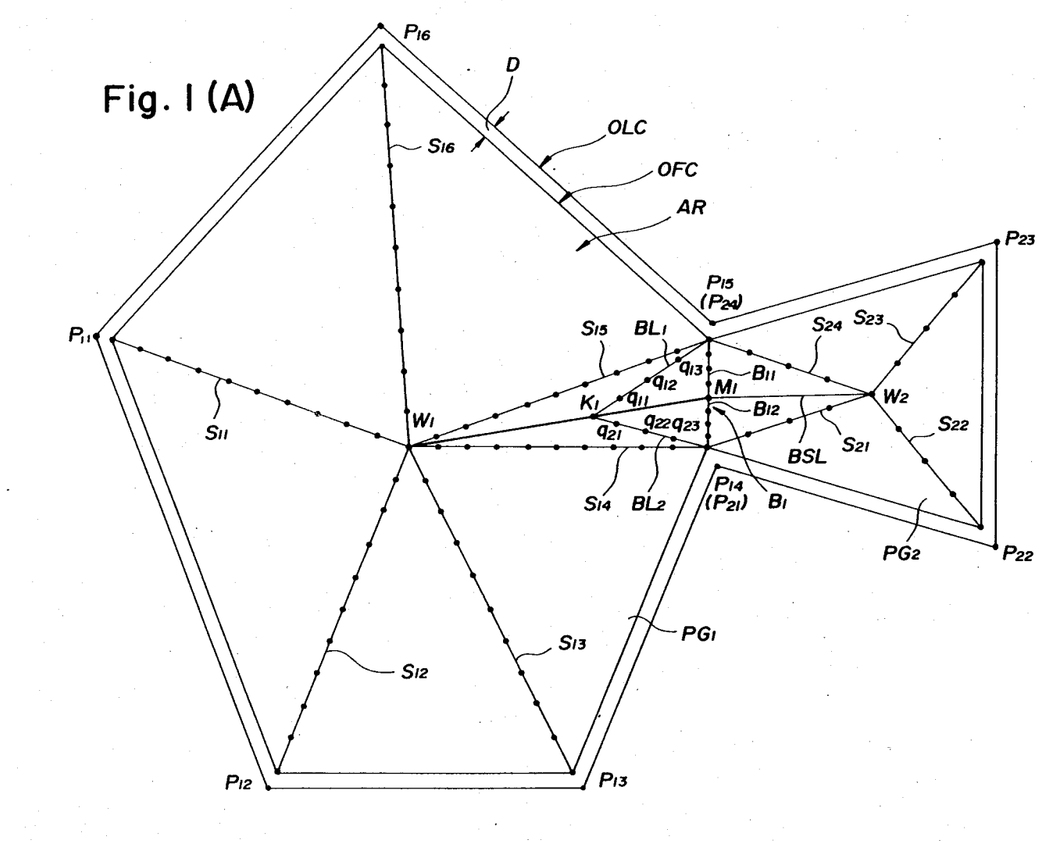
FIGS. 1(A) and 1(B) are views for describing the general features of an area cutting method according to the present invention.
Figure 1B:
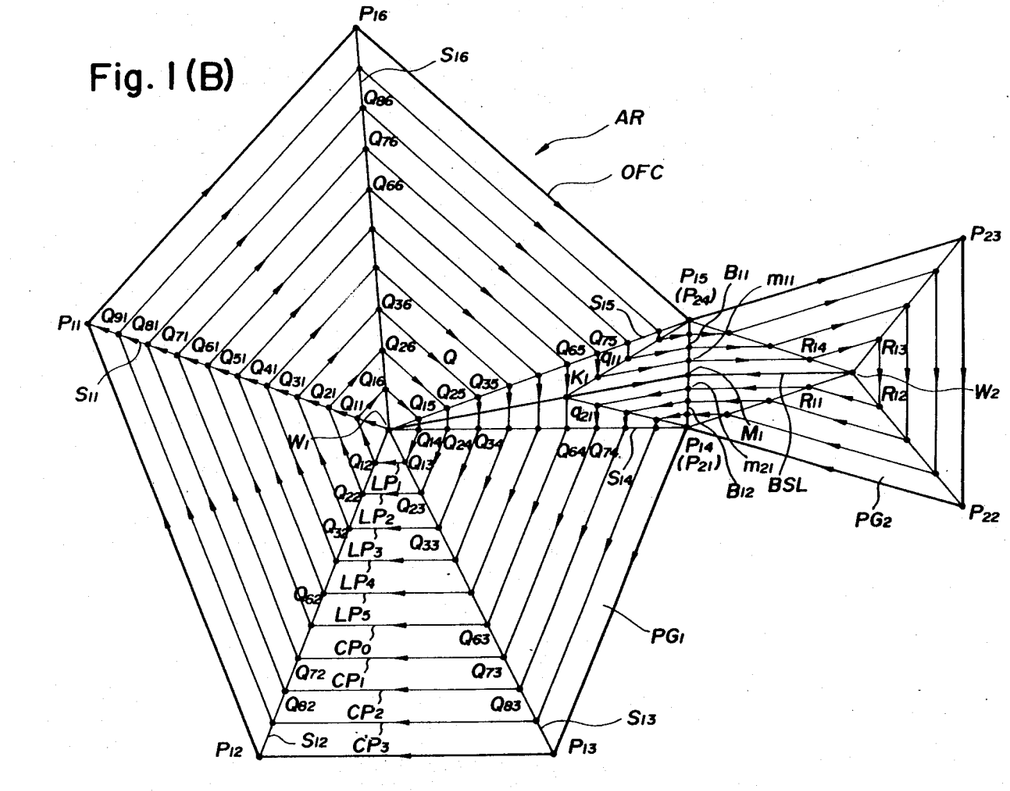

FIG. 1 is a view for describing the general features of an area cutting method according to the present invention. The area cutting method of the invention is basically composed of the following eight steps:

(1) a first step of partitioning an area AR into a plurality of convex polygons PGi (i=1, 2 ... );

(2) a second step of calculating a centroid Wi (i=1, 2 ... ) of each convex polygon;

(3) a third step of finding the longest line segments (S16, S23) among line segments Sij connecting the centroid Wi and apex Pij in every convex polygon, and finding, for every convex polygon, a number of partitions Ni for which a length of a partitioned line segment obtained by equally partitioning each longest line segment will have a value closest to a preset cut-in pitch P without exceeding the cut-in pitch P;

(4) a fourth step of finding the convex polygon PG1 having the maximum number M of partitions, and finding a maximum number m of partitions from among numbers of partitions of convex polygons adjacent the largest convex polygon;

(5) a fifth step of dividing, into M equal parts, line segments S11–S16 connecting a centroid W1 and apices P11–P16 of the largest convex polygon, equally dividing, into m equal parts, line segments S21–S24 connecting a centroid W2 and apices S21–S24 of each convex polygon PG2 adjacent the largest convex polygon, and equally dividing, into m equal parts, median lines Bi1, Bi2 (=B11, B12) connecting a mid-point Mi (=M1) of a boundary line Bi (=B1) between the largest convex polygon and the adjacent convex polygon with the two end points of the boundary line;

(6) a sixth step of generating a plurality of closed paths LP1−LP(L−m−1) [see FIG. 1(B)] successively connecting corresponding partitioning points Qi1→Qi6→Qi5→Qi4→Qi3→Qi2→Qi1 (i=1, 2, ... 5), on the centroid side, of the line segments S11–S16 connecting the centroid W1 and apices of the largest convex polygon;

(7) a seventh step of generating a plurality of closed paths CPo−CPm (=CP3) successively connecting corresponding partitioning points (Qij, Rij, mij) of line segments S11−S16, S21−S24, which connect the centroid and apices of each convex polygon, and of the median lines B11, B12; and (8) an eighth step of moving a tool along each of the generated closed paths LP1−LP(M-m), CPo−CPm.

Figure 2:
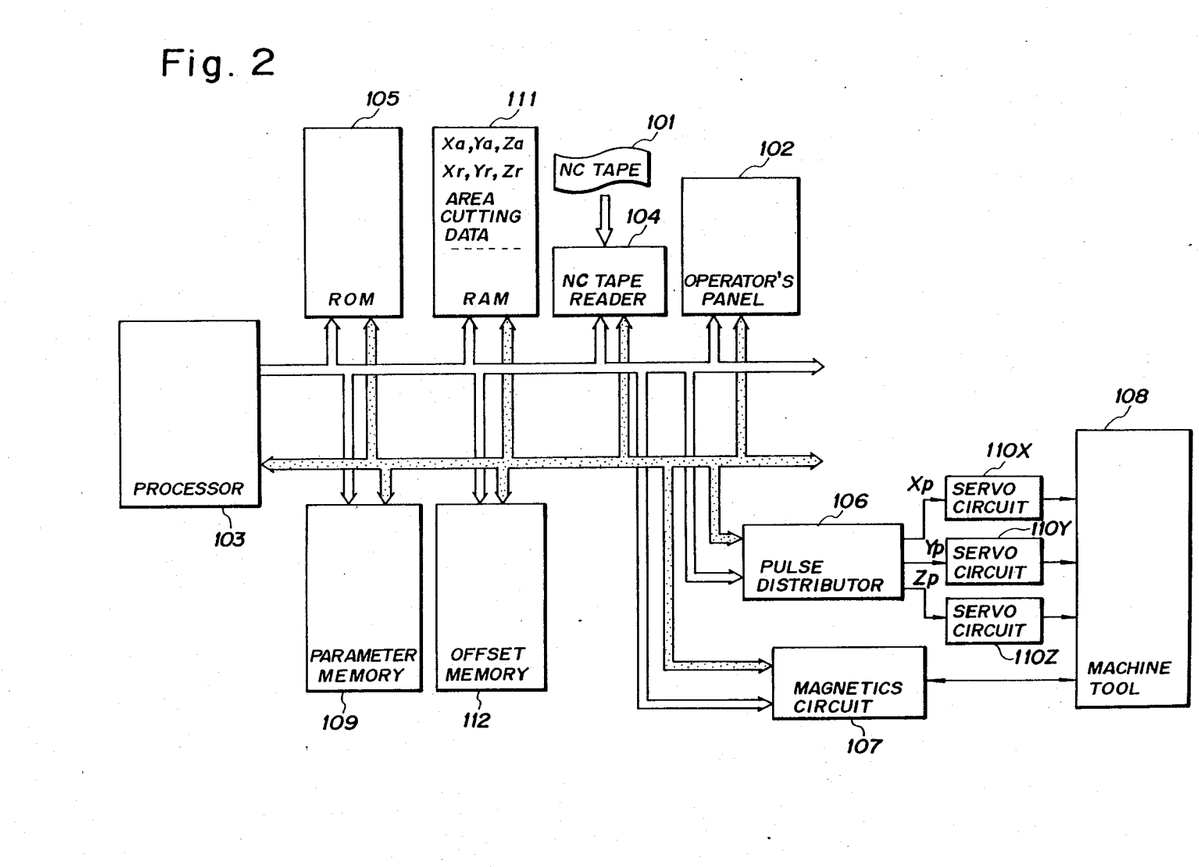
FIG. 2 is a block diagram of an NC system for practicing the area cutting method of the present invention.
Figure 3A:
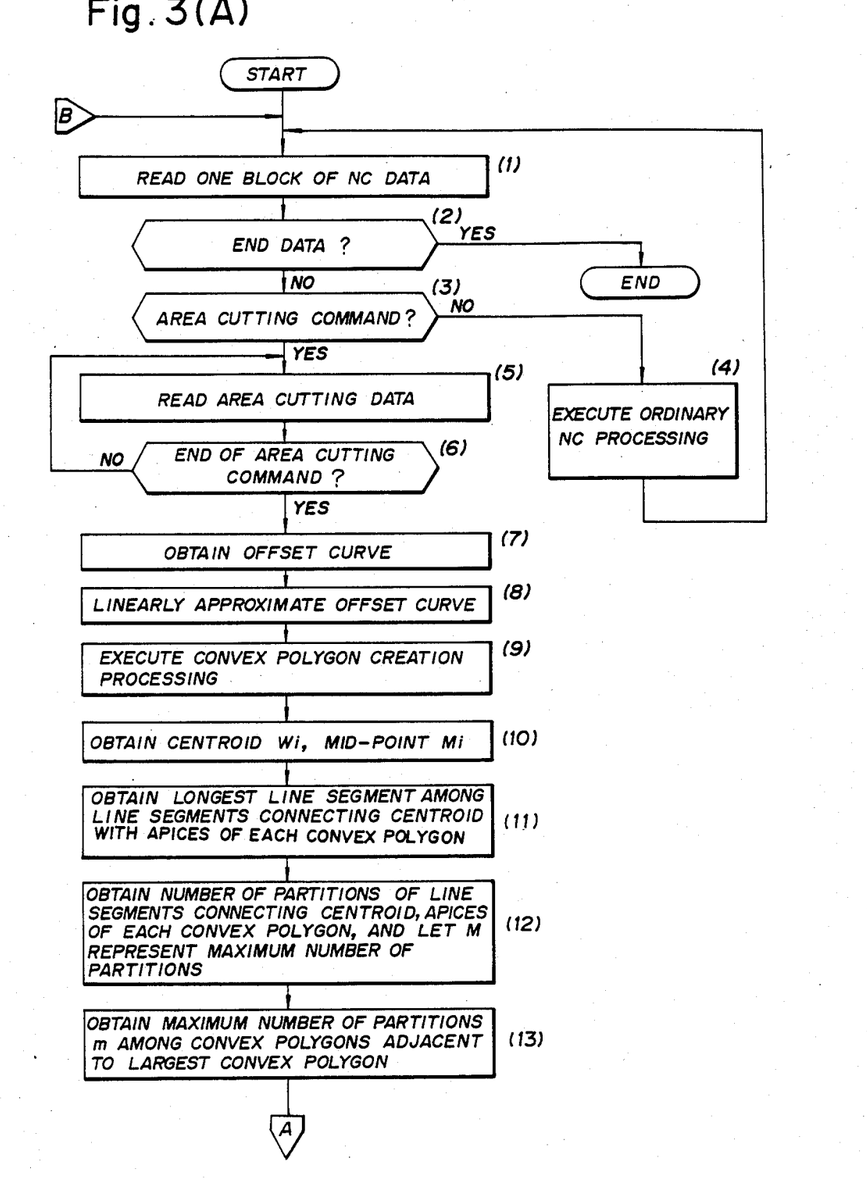
FIGS. 3(A) and 3(B) are a flowchart of processing indicative of the area cutting method of the present invention.
Figure 3B:
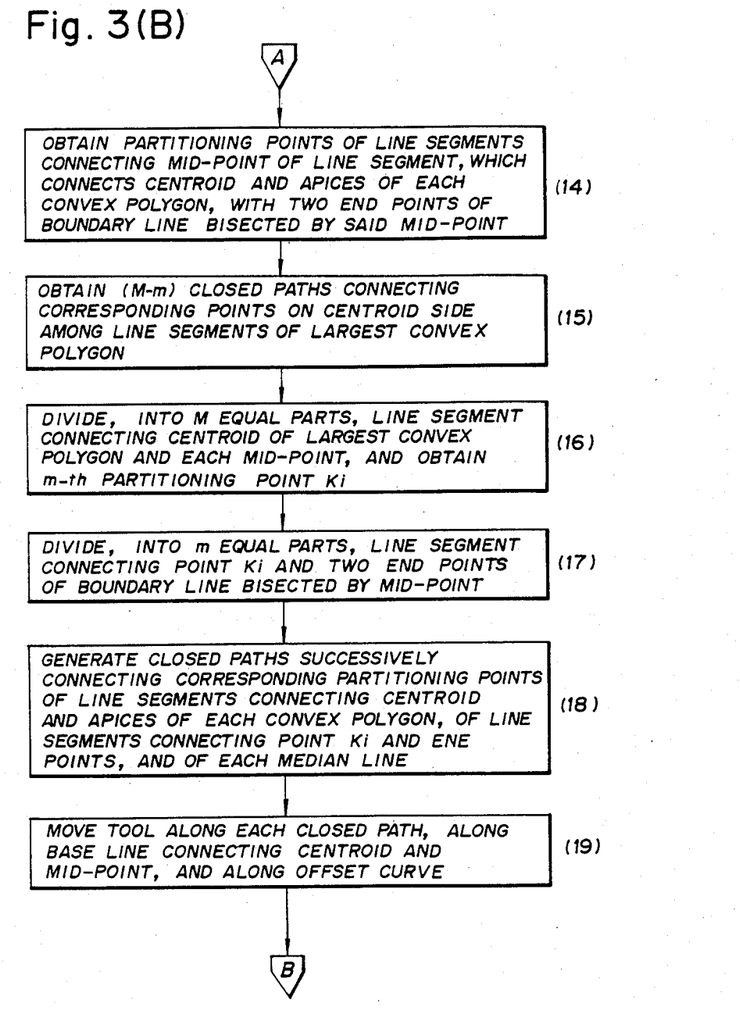

FIG. 2 is a block diagram of an NC system for practicing the area cutting method of the present invention, and FIGS. 3(A) and 3(B) are a flowchart of processing. The area cutting method of the present invention will now be described in conjunction with FIGS. 1(A) through 3(B).

Area cutting data necessary for area cutting are recorded at appropriate locations on an NC tape or memory (assumed to be an NC tape hereafter) 101 shown in FIG. 2. Specifically, in addition to ordinary numerical control data, area cutting instructions, coordinate values $(x_j,y_j)$ of the apices P11, P12, P13, P14 (=P21), P22, P23, P15 (=P24), P16 of the area, the radius $r_j$ of a circular arc (no circular arc exists in the embodiment of FIG. 1), finishing margin t, cut-in pitch P, cutting velocity fc, and data for identifying the end of the area cutting data, are recorded on the NC tape 101. Note that the positions of the apices and the radius of the circular arc are commanded in sets in the e.g. the form $(x_j,y_j,r_j)$, with $r_j=0$ being commanded in the case of straight lines. Accordingly, in the area cutting of the area AR shown in FIG. 1, the area is specified by $Xx_1 Yy_1 R0$;

$Xx_2 Yy_2 R0;$
$Xx_3 Yy_3 R0;$
$Xx_4 Yy_4 R0;$
$Xx_5 Yy_5 R0;$
$Xx_6 Yy_6 R0;$
$Xx_7 Yy_7 R0;$
$Xx_8 Yy_8 R0;$ (1) When a cycle start button on an operator's panel 102 is pressed to start the system, a processor 103 causes an NC data reader 104 to read one block of NC data from an NC tape 101.

(2) Next, under the control of a control program stored in a ROM 105, the processor 103 decodes the read NC data and determines whether the NC data are indicative of program end "M02" or tape end "M30".

Processing is ended if the data are indicative of program end or tape end.

(3) If the data are indicative of program end, the processor determines whether the NC data are indicative of an area cutting command.

(4) If the NC data are path data and not an area cutting command, then path processing is executed. If an item of NC data is an M-, S- or T- function instruction to be delivered to the machine side, then the instruction is applied to a machine tool 108 through a magnetics circuit 107.

When an item of NC data is path data, the processor 103 finds incremental values $X_i, Y_i, Z_i$ along the respective axes as well as amounts of movement $\Delta X, \Delta Y, \Delta Z$ along the respective axes per unit time $\Delta T$ based on feed rate F. These are inputted to a pulse distributor 106.

On the basis of the input data, the pulse distributor 106 performs a simultaneous three-axis pulse distribution calculation to generate distributed pulses $X_p, Y_p, Z_p$. These are delivered to servo circuits 110X, 110Y, 110Z for the respective axes to transport the tool along the cutting path.

The processor 103, in accordance with the following formulae, updates the present position $X_a, Y_a, Z_a$ every $\Delta T$ sec, $X_a, Y_a, Z_a$ having been stored in a RAM 111:

$$X_a \pm \Delta X \to X_a \quad (1a)$$

$$Y_a \pm \Delta Y \to Y_a \quad (1b)$$

$$Z_a \pm \Delta Z \to Z_a \quad (1c)$$

The sign depends upon the direction of movement. Similarly, in accordance with the following formulae, the processor 103 updates remaining traveling distances $X_r, Y_r, Z_r$ (the initial values of which are the incremental values $X_i, Y_i, Z_i$, respectively) every $\Delta T$ sec, $X_r, Y_r, Z_r$ having been stored in the RAM 111:

$$X_r - \Delta X \to X_r \quad (2a)$$

$$Y_r - \Delta Y \to Y_r \quad (2b)$$

$$Z_r - \Delta Z \to Z_r \quad (2c)$$

When the following condition is established:

$$X_r = Y_r = Z_r = 0 \quad (3)$$

the processor 103 treats this as indicating that the movable element has arrived at a target position and causes the NC data reader 104 to read the next item of NC data.

(5) If an item of NC data read from the NC tape 101 is found to be an area cutting command, the processor 103 causes the NC data reader 104 to read the area cutting data and store the data in the RAM 111 until the code indicating the end of the area cutting data is read out.

(6) Whenever an item of NC data is read, the processor 103 checks the NC data to determine whether it is a code indicative of the end of the area cutting data.

(7) If the NC data is indicative of the end of area cutting data, the processor 103 calculates the curve OFC, which is offset from the curve OLC (FIG. 1) of the external shape by a distance D (=ra+t), the latter being obtained by adding the tool radius ra and the finishing margin t. It should be noted that the tool radius ra is obtained by reading a radius value corresponding to a commanded tool number from an offset memory 112, which stores the correspondence between tool numbers and tool radii.

Figure 4:
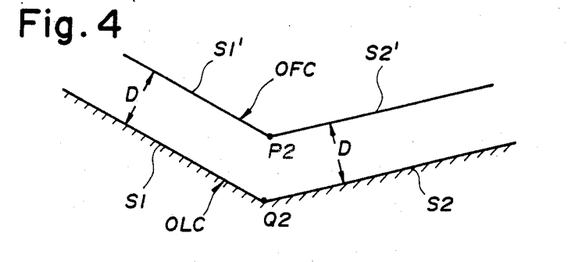
FIG. 4 is a view for describing a method of calculating an offset curve.

The offset curve OFC is found through the following processing. Specifically, as shown in FIG. 4, let two straight lines specifying the curve OLC of the external shape be S1 and S2. Straight lines S1', S2' offset from the straight lines S1, S2, respectively, by the distance D are found. The intersection P2 of the straight lines S1', S2' is then found. The intersection P2 is one point specifying the offset curve OFC. Accordingly, if points of intersection are found in a similar manner and stored in the RAM 111, the offset curve OFC will be obtained.

(8) The processor 103 now linearly approximates a circular arc portion of the offset curve OFC if the curve has a circular arc portion.

It should be noted that there is no circular arc portion in the embodiment of FIG. 1. In performing the linear approximation processing, it is so arranged that the maximum distance between the circular arc portion and the straight line takes on a value smaller than the cut-in pitch. FIG. 5 is a view for describing the linear approximation processing.

Figure 5A:
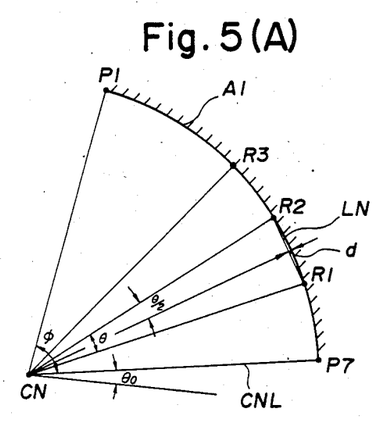
FIGS. 5(A) and 5(B) are views illustrating methods of linear approximation of a circular arc portion.

For a case where the inner side of a circular arc A1 is the area to be cut, as shown in FIG. 5(A), the maximum distance d between the circular arc A1 and the straight line (chord) LN is given by $$d = r - r \cdot \cos(\theta/2) \quad (4)$$

where the radius of the arc is r and the central angle of the chord LN is $\theta$. Accordingly, the central angle $\theta$ for which $d \leq P$ holds, namely the central angle $\theta$ that satisfies the relation $$\cos(\theta/2) \geq 1 - (P/r) \quad (5)$$

is found, the central angle $\phi$ of the circular arc A1 is partitioned at the angle $\theta$ and the coordinate values of each partitioning point $R_i$ are stored in the RAM 111. This ends the processing for linear approximation of the circular arc portion.

Figure 5B:
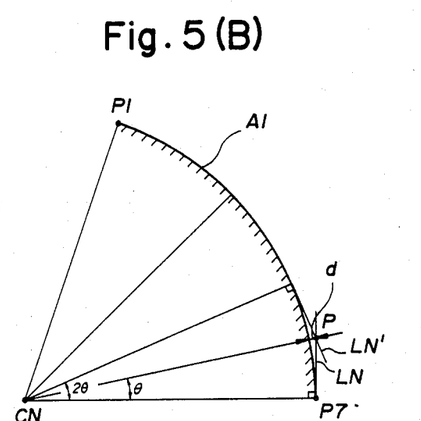

For a case where the outer side of a circular arc A1 is the area to be cut, as shown in FIG. 5(B), the maximum distance d between the circular arc A1 and the intersection P between the straight lines LN, LN' is given by $$d = (r/\cos\theta) - r \quad (6),$$

Accordingly, the angle $\theta$ for which $d \leq P$ holds, namely the angle $\theta$ that satisfies the relation $$\cos\theta \geq r/(r+P) \quad (7)$$

is found, the point $R_i$ linearly approximating the circular arc portion on the basis of $\theta$ is found, and this is stored in the RAM 111. This ends the processing for linear approximation.

(9) When the linear approximation processing ends, the processor 103 performs convex polygon creation processing for dividing, into plural convex polygons, the area bounded by an offset curve (OFC in the embodiment of FIG. 1), obtained by the linear approximation. It should be noted that two convex polygons PG1, PG2 are created by this convex polygon creation processing in the case of FIGS. 1(A) and 1(B). For a description of convex polygon creation processing, see the specification of U.S. Ser. No. 776,205.

(10) When the processing for creating the convex polygons ends, the processor 103 calculates the centroids W1, W2 (see FIG. 1) of the respective convex polygons PG1, PG2 and the mid-point $M_i(=M1)$ of the boundary line $B_i$ ($i=1$) of two mutually adjacent convex polygons. The coordinate values of the centroid of a convex polygon are calculated through processing which will now be described.

Figure 6:
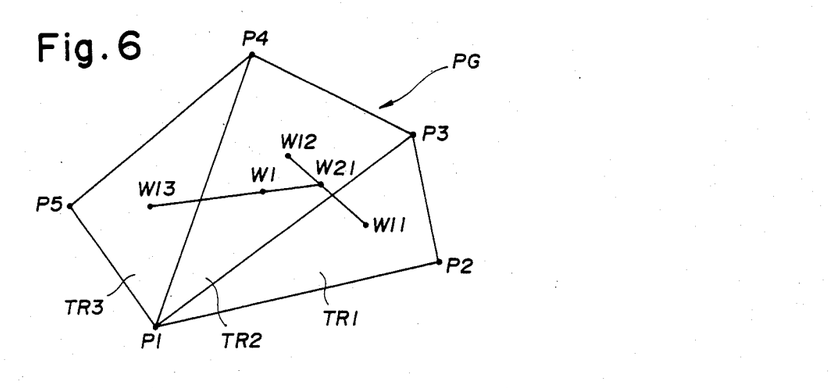
FIG. 6 is a view for describing a method of calculating a centroid.

As shown in FIG. 6, a convex polygon PG is broken down into a plurality of triangles TR1 through TR3 and the centroids W11 through W13 and areas SQ1 through SQ3 of the respective triangles are calculated. Next, a point W21 that divides a line segment W12W11 connecting the centroids W11, W12 into the ratio SQ1:SQ2 (area ratio) is found. Note that the point W21 is the centroid of a quadrilateral P1P2P3P4. After the point W21 is calculated, a point W1 is found that divides a line segment W13W21 into the area ratio (SQ1+SQ2):SQ3. The point W1 is the centroid of the convex polygon PG.

When the centroids $W_i$ ($i=1, 2$) and mid-point M1 are found in the above manner, the coordinate values of the centroids and mid-point are stored in the RAM 111 in the order W1, M1, W2. This generates a base line BSL.

(11) Thereafter, for each of the convex polygons PG1, PG2, the processor 103 finds the line segment having the longest length among the line segments (S11–S16; S21–S24) connecting the respective centroids and apices. In the embodiment of FIGS. 1(A) and 1(B), line segment S16 is the longest for convex polygon PG1 and line segment S23 is the longest for convex polygon PG2.

(12) Next, the processor finds a number of partitions N1 for which a length of a partitioned line segment obtained by equally partitioning the longest line segment S16 will have a value closest to the cut-in pitch P without exceeding the cut-in pitch P. Similarly, the processor finds a number of partitions N2 with regard to the longest line segment S23. Thus, the processor obtains a number of partitions Ni for each longest line.

Thereafter, the processor 103 obtains the largest number of partitions M and the largest convex polygon. In the embodiment of FIG. 1, M=10 and the largest convex polygon is PG1.

(13) The processor 103 then finds a maximum number m of partitions from among numbers Ni of partitions of convex polygons adjacent the largest convex polygon. Since PG2 is the only adjacent convex polygon in the embodiment of FIGS. 1(A) and 1(B), the number of partitions of this convex polygon is m; hence, m=4.

(14) When m has been found, the line segments S11–S16 connecting the centroid W1 and apices P11–P16 of the largest convex polygon PG1 are each divided into M equal parts, the line segments S21–S24 connecting the centroid W2 and apices S21–S24 of the adjacent convex polygon PG2 are each divided into m equal parts, and median lines B11, B12 connecting a mid-point $M_i$ ($=M1$) of a boundary line $B_i$ ($=B1$) with the two end points P14, P15 of the boundary line are each divided equally by m.

(15) When the partitioning points have been obtained, the processor 103 generates (M-m-1) closed paths LP1–LP5 [see FIG. 1(B)] successively connecting corresponding partitioning points $Qi1 \rightarrow Qi6 \rightarrow Qi5 \rightarrow Qi4 \rightarrow Qi3 \rightarrow Qi2 \rightarrow Qi1$ ($i=1, 2, \ldots 5$), on the centroid side, of the line segments S11–S16 connecting the centroid W1 and apices P11–P16 of the largest convex polygon PG1.

(16) The processor thenceforth divides, into M equal parts, the line segment W1M1 connecting the centroid W1 and mid-point M1 of the largest convex polygon PG1, and obtains an m-th partitioning point Ki ($=K1$) counting from the mid-point side [see FIG. 1(A)].

(17) When the partitioning point K1 has been found, the processor obtains partitioning points q11–q13, q21–q23 which respectively divide, into m equal parts, two line segments BL1, BL2 connecting the point K1 with the two end points P14, P15 of boundary line B1, which is bisected by the mid-point M1.

(18) Thereafter, the processor 103 generates closed paths CP1–CP3 successively connecting corresponding partitioning points of line segments Sij (S11–S16, S21–S24) connecting the centroid and apices of each convex polygon, of the two line segments BL1, BL2 connecting the point Ki (K1) and points P14, P15, and of the median lines B1, B2. Note that the closed path CP1 is $Q71 \rightarrow Q76 \rightarrow Q75 \rightarrow q11 \rightarrow m11 \rightarrow R14 \rightarrow R13 \rightarrow R12 \rightarrow R11 \rightarrow m21 \rightarrow q21 \rightarrow Q74 \rightarrow Q73 \rightarrow Q72 \rightarrow Q71$, and closed path CP2 is $Q81 \rightarrow Q86 \rightarrow Q85 \rightarrow q12 \rightarrow m12 \rightarrow R24 \rightarrow R23 \rightarrow R22 \rightarrow R21 \rightarrow m22 \rightarrow q22 \rightarrow Q84 \rightarrow Q83 \rightarrow Q82 \rightarrow Q81$. The closed path CP3 is similarly generated. Further, CPo is $Q61 \rightarrow Q66 \rightarrow Q65 \rightarrow K1 \rightarrow M1 \rightarrow W2 \rightarrow M1 \rightarrow K1 \rightarrow Q64 \rightarrow Q63 \rightarrow Q62 \rightarrow Q61$.

Furthermore, an arrangement can be adopted in which steps (16), (17) are deleted and the partitioning points q11–q13, q21–q23 are not obtained, in which case step (18) would entail generating a plurality of closed paths connecting corresponding partitioning points of the plural line segments, which connect the centroid and apices of each convex polygon, and of the median lines.

(19) When the closed paths LP1–LP3 and CPo–CP3 have been obtained as set forth above, the processor 103
(a) moves the tool first to the centroid W1,
(b) then moves the tool along the closed paths $LP1 \rightarrow LP2 \rightarrow LP3 \rightarrow LP4 \rightarrow LP5 \rightarrow CPo \rightarrow CP1 \rightarrow CP2 \rightarrow CP3$, and
(c) finally moves the tool along the offset curve OFC, thereby completing the cutting of area AR.

Accordingly, by using the coordinate values of W1 stored in the RAM 111 through the above-described processing, the processor 103 obtains numerical data (incremental values between an initial position and the starting point W1) for making the tool approach the starting point W1 from the initial position, and thereafter executes ordinary path control using the incremental values.

When the approach is completed, the processor 103 moves the tool to the point Q11 in the cutting mode, then moves the tool along the first closed path LP1 in a cutting feed mode and thereafter moves the tool successively along LP2, LP3, ... LP5, CPo, CP1, CP2, .. CP3 in a similar manner to perform cutting.

Finally the tool is moved along the offset curve OFC in accordance with the data specifying the offset curve OFC stored in the RAM 111. This ends the area cutting processing. Thereafter, the next item of NC data is read from the NC tape and the foregoing processing is repeated.

Though a case has been described where the tool movement sequence is LP1→LP2 . . . LP5→CPo→CP1→CP2→CP3 when performing cutting, it is permissible for the sequence to be reversed.

The foregoing description deals with a case where there are two convex polygons. However, as shown in FIG. 7(A), the invention can also be applied to a case where two or more convex polygons PG2 - PG4 are connected to the largest convex polygon PG1.

Figure 7:
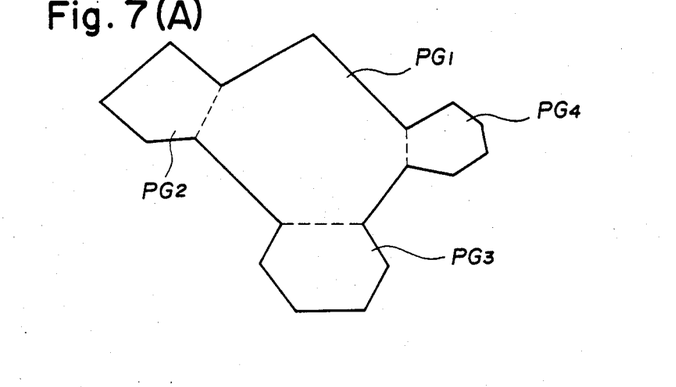
FIGS. 7(A) and 7(B) are views of other areas to which the invention can be applied.

Furthermore, though the invention has been described on the premise that a single convex polygon is adjacent to the largest convex polygon, the invention is not limited thereby but can also be applied to a case where other convex polygons PG21, PG31 are connected to the convex polygon PG4, as shown in FIG. 7(B). In such case, the number of partitions Ni of the convex polygon PG4 would be decided upon taking the other convex polygons PG31, PG21 into consideration. More specifically, if the convex polygon PG4 is the largest or second largest, the number of partitions Ni of this convex polygon is decided irrespective of the convex polygons PG21, PG31. However, if the convex polygon PG4 is the smallest (e.g. PG4<PG31<PG21), then the number of partitions Ni of the convex polygon PG4 is the number of partitions of the second largest convex polygon PG31.

Further, the present invention is not limited to the illustrated embodiment. It is possible to adopt an arrangement wherein an NC tape (NC data) containing tool path data for area cutting is prepared through the above-described method and the NC data are fed into an NC unit to cut the area.

In accordance with the present invention, the number of cutting paths of convex polygonal portions is changed depending upon the size of the convex polygonal portions in a method of cutting an area along paths defining a spider web-like pattern. In other words, cutting is performed at a cut-in pitch close to an allowable cut-in pitch regardless of the convex polygonal portion. This enables small convex polygonal portions to be cut with a small amount of tool movement, thus making it possible to raise area cutting efficiency in comparison with the prior-art method.

What is claimed is:

1. An area cutting method for cutting the interior of an area bounded by the curve of an external shape, comprising the steps of:
    a first step of dividing the area into a plurality of convex polygons;
    a second step of calculating the centroid of each convex polygon;
    a third step of finding the longest line segments among line segments connecting the centroid and apices in every convex polygon, and finding, for every convex polygon, a number Ni of partitions for which a length of a partitioned line segment obtained by equally partitioning each longest line segment will have a value closest to a preset cut-in pitch without exceeding said cut-in pitch;
    a fourth step of finding a convex polygon having a maximum number M of partitions, and finding a maximum number m of partitions from among numbers of partitions of convex polygons adjacent the largest convex polygon;
    a fifth step of dividing, into M equal parts, line segments connecting a centroid and apices of the largest convex polygon, equally dividing, into m equal parts, line segments connecting a centroid and apices of each convex polygon adjacent said largest convex polygon, and equally dividing, into m equal parts, median lines connecting a mid-point of a boundary line between the largest convex polygon and an adjacent convex polygon with the two end points of said boundary line;
    a sixth step of generating a plurality of first closed paths successively connecting corresponding partitioning points, on the centroid side, of the line segments connecting said centroid and apices of the largest convex polygon;
    a seventh step of generating a plurality of second closed paths successively connecting corresponding partitioning points of line segments, which connect the centroid and apices of each convex polygon, and of the median lines; and
    an eighth step of moving a tool along each of said generated closed paths.

2. An area cutting method according to claim 1, wherein when another convex polygon is connected to a convex polygon adjacent to said largest convex polygon, the number Ni of partitions of the adjacent convex polygon is obtained by also taking said another convex polygon into consideration.

3. An area cutting method according to claim 1, wherein said seventh step includes:
    a step of dividing, into M equal parts, a line segment connecting the centroid of the largest convex polygon and each mid-point, and obtaining an m-th partitioning point Ki counting from the mid-point side;
    a step of dividing, into m equal parts, line segments connected the point Ki and the two end points of the boundary line bisected by said mid-point; and
    a step of generating said plurality of second closed paths successively connecting corresponding partitioning points of line segments, which connect the centroid and apices of each convex polygon, of each line segment connecting the point Ki and end points, and of the median lines.

4. An area cutting method according to claim 3, wherein (M−m−1) first closed paths are generated in said sixth step, (m−1) second closed paths are generated in said seventh step, and there is further provided a step of generating a path, between said first closed paths and second closed paths, successively traversing an (M-m)th partitioning point, counting from the centroid side, among M partitioning points of each line segment connecting the centroid of the largest convex polygon and apices of said convex polygon, each partitioning point Ki, each mid-point Mi and the centroid Wi of each convex polygon.

5. An area cutting method according to claim 4, wherein said first step includes a step of obtaining an offset curve offset by a predetermined amount from the curve of the external shape, and a step of dividing an area bounded by said offset curve into a plurality of convex polygons.

6. An area cutting method according to claim 5, further comprising a step of generating a base line connecting each centroid and each mid-point, and moving the tool along said base line.

7. An area cutting method according to claim 6, further including a step of moving the tool along said offset curve.

8. An area cutting method according to claim 4, wherein in a case where the curve of the external shape is composed of circular arcs and straight lines, said first step has steps of obtaining an offset curve offset a predetermined amount from the curve of the external shape, linearly approximating a circular arc portion of said offset curve, and dividing an area bounded by an offset curve approximated by straight lines into a plurality of convex polygons 9. An area cutting method according to claim 1, wherein the step of generating said closed paths comprises creating NC data for moving the tool along said closed paths.

* * * * *